United States Patent [19]

Tsutsumi et al.

[11] Patent Number: 5,164,450

[45] Date of Patent: Nov. 17, 1992

[54] BUTADIENE COPOLYMER RUBBER COMPOSITION

[75] Inventors: Fumio Tsutsumi; Mitsuhiko Sakakibara; Yoshihisa Fujinaga, all of Yokkaichi; Noboru Oshima, Suzuka; Tatsuo Fujimaki, Higashimurayama, all of Japan

[73] Assignees: Japan Synthetic Rubber Co.; Bridgestone Corporation, both of Tokyo, Japan

[21] Appl. No.: 582,810

[22] Filed: Sep. 14, 1990

Related U.S. Application Data

[63] Continuation of Ser. No. 316,529, Feb. 27, 1989, abandoned, which is a continuation of Ser. No. 94,054, Sep. 4, 1987, abandoned, which is a continuation of Ser. No. 834,505, Feb. 28, 1986, abandoned, which is a continuation of Ser. No. 734,218, May 15, 1985, abandoned.

[30] Foreign Application Priority Data

May 16, 1984 [JP] Japan ................................ 59-96368

[51] Int. Cl.$^5$ ............................................. C08L 9/06
[52] U.S. Cl. ........................................ 525/192; 525/191; 525/232; 525/236; 525/237; 525/332.3; 525/332.9; 526/340
[58] Field of Search .............. 526/340; 525/232, 191, 525/192, 236, 237, 332.3, 332.9

[56] References Cited

U.S. PATENT DOCUMENTS

| | | | |
|---|---|---|---|
| 3,980,625 | 9/1976 | Sakamoto et al. | 526/67 |
| 4,145,498 | 3/1979 | Farrar | 526/178 |
| 4,334,567 | 6/1982 | Bond | 526/340 |
| 4,367,325 | 1/1983 | Takeuchi | 526/340 |
| 4,383,085 | 5/1983 | Fujimaki et al. | 525/196 |
| 4,387,756 | 6/1983 | Ogawa | 526/340 |
| 4,397,994 | 8/1983 | Takeuchi | 526/340 |
| 4,523,618 | 6/1985 | Yamamoto et al. | 152/209 R |
| 4,547,560 | 10/1985 | Hattori | 526/340 |

*Primary Examiner*—Fred Teskin
*Attorney, Agent, or Firm*—Sughrue Mion Zinn Macpeak & Seas

[57] ABSTRACT

Disclosure is herein made of a rubber composition containing at least 30% by weight of a butadiene copolymer which is characterized in that: (i) the content of vinyl bonds in a polybutadiene portion is from 40 to 70%; (ii) the content of bound vinyl aromatic compound is from 25 to 50% by weight: (iii) the ratio Mw/Mn between the weight average molecular weight (Mw) and the number average molecular weight (Mn) when calculated as polystyrene according to the gel permeation chromatograph (GPC) method is from 1.8 to 5, and the distribution of the molecular weight is unimodal; (iv) the rate of the copolymer having the weight average molecular weight of not more than 100,000 when calculated as polystyrene is from 10 to 30%; (v) the rate of the copolymer having the weight average molecular weight of not less than 2,000,000 when calculated as polystyrene is from 10 to 30%; and (vi) the Mooney viscosity (ML$_{1+4}$ 100° C.) is from 20 to 100.

2 Claims, 1 Drawing Sheet

BUTADIENE COPOLYMER RUBBER COMPOSITION

This is a continuation of application Ser. No. 07/316,529, filed Feb. 27, 1989, now abandoned, which is a continuation of application Ser. No. 07/094,054, filed Sep. 4, 1987, now abandoned, which is a continuation of application Ser. No. 06/834,505, filed Feb. 28, 1986, now abandoned, which is a continuation of application Ser. No. 06/734,218, filed May 15, 1985, now abandoned.

BACKGROUND OF THE INVENTION (1) Field of the Invention

The present invention relates to a rubber composition which has large hysteresis loss, excellent fracture strength and good processability.

(2) Description of the Prior Art

As the rubber materials having large hysteresis loss, e.g., for tires, rubber vibration insulators and industrial products, there have been heretofore used butyl rubber, halogenated butyl rubber, ethylene-propylene diene rubber, emulsion-polymerized styrene-butadiene copolymer rubber containing a high content of styrene, polybutadiene rubber containing a high content of 1,2-double bonds, and polyisoprene rubber containing a high content of 3,4-double bonds and so on.

However, these rubber materials having large hysteresis loss are inferior in the covulcanizable property with diene rubbers such as high cis-polyisoprene rubber, natural rubber, high cis-polybutadiene rubber, emulsion polymerized styrene-butadiene rubber and the like, and have poorer fracture strength. Further, the smaller the dependency upon temperature of the hysteresis loss, that is, the value of loss tangent (tan δ) in a range of 25°-70° C., the more suitable is the rubber composition for the tires and the rubber insulation vibrators. However, it can not be said that the above-recited rubber materials possess satisfactory performances since they have large dependency upon temperature of the loss tangent.

Japanese Patent Application Laid-open Nos. 70,134/1982, 70,136/1982 and 70,137/1982 describe that the processability, the wet-skid performance, and the wear resistance are improved by using SBR containing a high content of vinyl bonds with a high content of styrene. But, such an SBR can not maintain high hysteresis loss characteristics over a wide range.

There is described, for instance, Japanese Patent Application Laid-open Nos. 180,615/1982, 180,646/1982, 4,633/1984 and 4,644/1984 that the wet-skid performance, rolling friction characteristics, and processability are improved by blending polymers having different molecular weights to obtain polymodal distribution of the molecular weight, but it is an actual situation that these diene rubber compositions do not afford high hysteresis loss characteristics or excellent balance between the hysteresis loss characteristics and the fracture characteristics.

SUMMARY OF THE INVENTION

It is an object of the present invention to provide a butadiene copolymer rubber composition which has an excellent copolymerizable property with other diene rubber, a large hysteresis loss, and small dependency upon temperature of hysteresis loss in a range of 25°-70° C., excellent fracture strength and good processability.

According to the present invention, there is a provision of a rubber composition containing at least 30% by weight of a butadiene copolymer which is characterized in that: (i) the content of vinyl bonds in a polybutadiene portion is from 40 to 70%; (ii) the content of bound vinyl aromatic compound is from 25 to 50% by weight; (iii) the ratio Mw/Mn between the weight average molecular weight (Mw) and the number average molecular weight (Mn) when calculated as polystyrene according to the gel permeation chromatograph (GPC) method is from 1.8 to 5, and the distribution of the molecular weight is unimodal; (iv) the weight of the copolymer having the weight average molecular weight of not more than 100,000 when calculated as polystyrene is from 10 to 30%; (v) the weight of the copolymer having the weight average molecular of not less than 2,000,000 weight when calculated as polystyrene is from 10 to 30%; and (vi) the Mooney viscosity $(ML_{1+4} 100° C.)$ is from 20 to 100.

These and other objects, features and advantages of the present invention will be well appreciated upon reading of the following description of the invention when taken in conjunction with the attached drawing with understanding that some modifications, variations and changes of the same could be easily done by the skilled in the art to which the invention pertains without departing from the spirit of the invention or the scope of claims appended hereto.

BRIEF DESCRIPTION OF THE ATTACHED DRAWING

FIG. 1 shows GPC charts of Samples A, C and I, respectively.

DETAILED DESCRIPTION OF THE INVENTION

Figure 1:
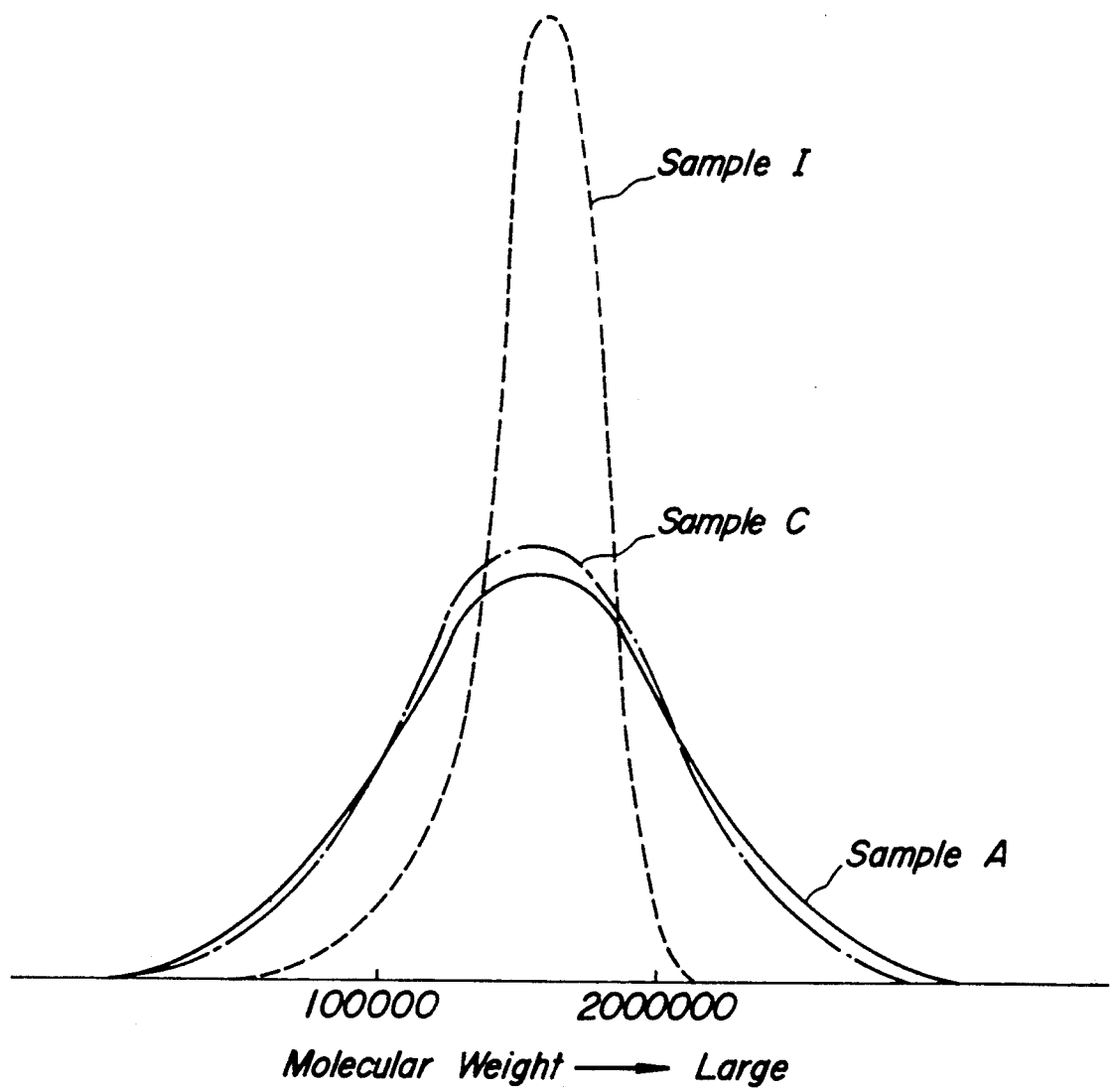

The invention will be described more in detail with referring to the attached drawing.

According to the present invention, the above-mentioned butadiene copolymer may be used, as a rubber composition, singly or in combination with other diene rubber in a blended state. As such other diene rubber, mention may be preferably made of natural rubber, synthesized polyisoprene rubber, and polybutadiene rubber containing a high content of 1,4-bonds, and the use amount thereof is preferably not more than 70% by weight.

The content of the vinyl bonds in the polybutadiene portion of the butadiene copolymer according to the present invention is from 40 to 70%. If the content of the vinyl bonds is less than 40%, the amount of the polyvinyl aromatic compound block produced is increased to raise the hardness, which gives adverse affects upon the physical properties of the resulting rubber.

It is unfavorable that the content of the vinyl bonds exceeds 70%, since the fracture strength is deteriorated.

The content of the bound vinyl aromatic compound is from 25 to 50% by weight, and preferably from 30 to 50% by weight. If the content is less than 25% by weight, the hysteresis loss is small, while if it exceeds 50% by weight, unfavorably the dependency upon the temperature of the impact resilience in a range of from 25° C. to 70° C. is larger and the fracture strength is inferior.

As the vinyl aromatic compounds, mention may be made of styrene, vinyl toluene, p-methylstyrene, o-methylstyrene, vinylnaphthalene and so on.

The content of the polyvinyl aromatic compound block in the butadiene copolymer according to the present invention is not more than 5% by weight with respect to the total bound vinyl aromatic compound when measured according to the I. M. Kolthoff et al's oxidation-decomposition method (J. Polymer Sci. Vol. 1, p 429 (1946)).

It is important in the case of the butadiene copolymer according to the present invention that the copolymer has the respectively specified amounts of te low molecular weight component and the high molecular weight component as well as the wide distribution of the molecular weight with the unimodal distribution in order that the dependency upon the temperature of the hysteresis loss in a range of from 25° to 70° C. may be made smaller and that the excellent processability and fracture strength may be imparted upon the copolymer.

The low molecular weight component is necessary to obtain high hysteresis loss which is low in the dependency upon temperature, and improve the processability, particularly in the rolling operation. On the other hand, the high molecular weight component is necessary to obtain an excellent fracture strength and excellent processability in extrusion. Even when the content of either the low or high molecular weight component is fallen outside of the specified range according to the present invention, the above-mentioned balance between the processability and the physical properties can not be attained. Further, in order to realize both the fracture strength and the processability, it is important that the distribution of the molecular weight is unimodal. Even when the polymer being bimodal and polymodal in the molecular weight distribution has the molecular weight distribution (Mw/Mn), the content of the low molecular weight component, and the content of the high molecular weight component fallen within the scope of the present invention, its processability and the physical properties can be improved to some extent but still insatisfactorily.

The ratio Mw/Mn between the weight average molecular weight (Mw) and the number average molecular weight (Mn) of the butadiene copolymer is from 1.8 to 5, preferably from 2.5 to 5, and it is necessary that the copolymer according to the present invention includes the low molecular weight component of the weight average molecular weight of not more than 100,000 in an amount of from 10 to 30% by weight when calculated as polystyrene, and the high molecular weight component having the weight average molecular weight of not less than 2,000,000 when calculated as polystyrene in an amount of from 10 to 30% by weight. If Mw/Mn is less than 1.8, the dependency upon temperature of the hysteresis loss is large, while if Mw/Mn is over 5, it is difficult to control the low molecular weight component or the high molecular weight component to be in the respectively specified ranges.

Further, if the content of the low molecular weight component is less than 10%, the processability such as the roll retention becomes poor, while the content exceeds 30%, the fracture strength is lowered. If the content of the high molecular weight component is less than 10%, the processability such as roll retention becomes poor, while if it exceeds 30%, the processability becomes poorer in the extrusion molding. In addition, the Mooney viscosity ($ML_{1+4}100°$ C.) of the butadiene copolymer is from 20 to 100. If the Mooney viscosity is less than 20, the fracture strength becomes poorer, while if it exceeds 100, the processability in the extrusion, the rolling operation and the like becomes deteriorated.

Although the butadiene copolymer according to the present invention may be obtained by using various processes, the most industrially preferable method is one in which the copolymer is obtained by continuously copolymerizing 1,3-butadiene containing 1,2-butadiene and a vinyl aromatic compound in a vessel type or tubular type reactor in a hydrocarbon solvent in the presence of an ether or a tertiary amine with using an organic lithium compound as an initiator. Upon necessity, halogenated silicon, adipic acid diester, alkylene carbonate, divinyl benzene, or the like is added at the final stage of the copolymerization reaction to effect coupling reaction. Moreover, a catalyst and/or a monomer may be added during the polymerization reaction. However, it is unfavorable, from the standpoint of the hysteresis loss characteristics, that tin tetrachloride is used as a coupling agent.

As the hydrocarbon solvent, use may be made of one selected from, for instance, hexane, heptane, cyclohexane, benzene, and a mixture selected thereamong. It may be used in an amount of from 200 to 1,000 parts by weight per 100 parts by weight of the monomer. As the organic lithium compound initiator, use may be made of n-butyllithium, sec-butyllithium, tert-butyllithium and so on in an amount of 0.02 to 2 parts by weight per 100 parts by weight of the monomer. As the ether or the tertiary amine, use may be made of dimethoxybenzene, tetrahydrofuran, dimethoxyethane, ethylene glycol dibutyl ether, pyridine, N,N,N',N'-tetramethylenediamine and so on.

The polymerization temperature is preferably in a range of from 30° to 100° C.

The rubber composition containing the butadiene copolymer obtained according to the present invention may be used as the tire tread rubber material and various anti-vibration raw material while the excellent fracture characteristics and processability, and high hysteresis loss characteristics thereof being utilized. In this case, as the rubber material to be blended with the butadiene copolymer according to the present invention, natural rubber and synthesized polyisoprene rubber which are excellent in the compatibility with the butadiene copolymer according to the present invention and polybutadiene rubber which has a high content of 1,4-double bonds with a low glass transition temperature are preferred, since the butadiene copolymer according to the present invention has a relatively high glass transition temperature. As compounding ingredient, use may be made of commonly used ones such as carbon black, process oil (aromatic oil, naphthene oil, paraffinic oil and the like), a filler, a vulcanization accelerator, a vulcanizer.

The present invention will be explained below more concretely with referring to Examples, but the invention is not restricted by these Examples so long as the gist of the invention is maintained.

EXAMPLES 1–7 AND COMPARATIVE EXAMPLES 1–8

Polymers to be used in the following Examples and Comparative Examples were obtained in the following manner.

Sample A

Into a reactor with an inner volume of 20 liters which was equipped with a stirrer and a jacket were continuously charged by means of a pump 20 g/min of butadiene containing 100 ppm of 1,2-butadiene and 10 g/min of styrene as a monomer, 150 g/min of cyclohexane and 1.5 g/min of tetrahydrofuran as a solvent, and n-butyllithium as a catalyst, in an amount of 0.055 g with respect to 100 g of a monomer, and the temperature of the reactor was controlled to be 70° C. Silicon tetrachloride was continuously added to the reaction mixture from an outlet at the top portion of the reactor at a rate of ¼ mole relative to 1 mole of the n-butyllithium, which was introduced into a second reactor connected to the above reactor to effect the coupling reaction. 0.7 part by weight of di-tert-butyl-p-cresol was added at an outlet of the second reactor with respect to 100 parts by weight of rubber, followed by desolvating and drying in the ordinary manners. Analysis results are shown in Table 1.

Sample B

A polymer was obtained in the same process as in Sample A except that the composition of the monomer charged was changed. Analysis results are shown in Table 1.

Sample C

A polymer was obtained in the same process as in Sample A except that 0.038 g of n-butyllithium was used. No coupling was carried out. Analysis results are shown in Table 1.

Sample D

After polymerization was carried out in a first reactor with respect to the same composition as in Sample A, 15 g/min of butadiene and 7 g/min of styrene as monomer and n-butyllithium were continuously charged in a second reactor and then the polymerization was carried out at 70° C. With no coupling being carried out, a given amount of di-tert-butyl-p-cresol was added and the desolvating and drying were carried out in the ordinary manners. Analysis results are shown in Table 1.

Sample E

A polymer was obtained by the same process as in Sample A except that 13.5 g/min of butadiene and 16.5 g/min of styrene were charged. Analysis results are shown in Table 1.

Sample F

A polymer was obtained by the same process as in Sample A except that 24 g/min of butadiene and 6 g/min of styrene were charged. Analysis results are shown in Table 1.

Sample G

A polymer was obtained by the same process as in Sample A except that 0.4 g/min of tetrahydrofuran was charged. Analysis results are shown in Table 1.

Sample H

A polymer was obtained by the same process as in Sample A except that 10 g/min of tetrahydrofuran was charged. Analysis results are shown in Table 1.

Samples I, J, and K 2,000 g of cyclohexane, 335 g of butadiene, and 165 g of styrene were charged into a 5 liter autoclave, to which 25 g of tetrahydrofuran was added. Then, polymerization was carried out under the conditions that the polymerization temperature and the amount of n-butyllithium were 70° C. and 0.23 g in the case of Sample I, 70° C. and 0.35 g in the case of Sample J, or 70° C. and 0.15 g in the case of Sample K so that the vinyl bonds and the bound styrene might be included in the respectively specified ranges. Analysis results are shown in Table 1.

Sample L

Using the same continuous polymerization reactor as in Sample A, a polymer was obtained except that the addition speeds of the monomer, the solvent and the catalyst were lowered, and the reaction temperature was set at 90° C. No coupling reaction was carried out, and the use amount of tetrahydrofuran was 4.5 g/min. Analysis results are shown in Table 1.

Sample M

Polymerization was carried out while 0.045 g of n-butyllithium was used relative to 100 g of a monomer, and the monomer and the solvent were charged at the same compounding recipe as in Sample A but at the speed of 0.7 time as fast as those of Sample A. Analysis results are shown in Table 1.

Compositions were prepared according to the compounding recipe in Table 2. The vulcanization conditions were 145° C. and 30 minutes.

The properties of the vulcanizates thus obtained and the roll processability of the unvulcanizated compositions are shown in Table 3.

Examples 1–4 and 6 have more excellent balance among the fracture strength, the hysteresis loss characteristics and the roll processability as compared with Comparative Examples 1–7.

Comparative Examples 1 and 4 have large dependency upon the temperature of hysteresis loss, and Comparative Examples 2, 5 and 7 have small hysteresis loss at high temperatures.

Further, Comparative Examples 3 and 6 are inferior in the fracture strength.

Example 5 is excellently lower in the dependency upon temperature of the hysteresis loss as compared with Comparative Example 8.

Example 7 had the same compounding recipe as in Table 2 except that 60 parts by weight of HAF carbon and 40 parts by weight of aromatic oil were used.

TABLE 1

| Sample | Bound amount in polymer Vinyl (%) | Bound amount in polymer Styrene (%) | Mw/Mn[*1] | Copolymer[*1] of not more than 100,000 molecular weight | Copolymer[*1] of not less than 2,000,000 molecular weight | Molecular[*1] weight distribution | ML$_{1+4}$, 100° C. | Polystyrene block content (wt %) (value relative to the whole bound styrene) |
|---|---|---|---|---|---|---|---|---|
| A | 46 | 33 | 3.0 | 14 | 21 | Unimodal | 58 | 0 |
| B | 45 | 38 | 2.9 | 13 | 19 | " | 59 | 0 |
| C | 46 | 33 | 2.0 | 11 | 13 | " | 60 | 0 |
| D | 45 | 33 | 2.8 | 14 | 18 | " | 62 | 0 |
| E | 41 | 55 | 3.0 | 13 | 19 | " | 60 | 0 |
| F | 56 | 20 | 2.9 | 14 | 20 | " | 59 | 0 |

TABLE 1-continued

| Sample | Bound amount in polymer Vinyl (%) | Bound amount in polymer Styrene (%) | Mw/Mn[1] | Copolymer[1] of not more than 100,000 molecular weight | Copolymer[1] of not less than 2,000,000 molecular weight | Molecular[1] weight distribution | $ML_{1+4}$-100° C. | Polystyrene block content (wt %) (value relative to the whole bound styrene) |
|---|---|---|---|---|---|---|---|---|
| G | 28 | 43 | 2.8 | 13 | 18 | " | 58 | 7 |
| H | 72 | 32 | 2.9 | 13 | 21 | " | 57 | 0 |
| I | 46 | 33 | 1.1 | 2 | 1 | " | 57 | 0 |
| J | 48 | 33 | 1.1 | 15 | not more than 1 | " | less than 10 | 0 |
| K | 47 | 33 | 1.2 | not more than 1 | 28 | " | 130 | 0 |
| L | 45 | 32 | 2.8 | 12 | 20 | " | 59 | 0 |
| M | 46 | 33 | 3.6 | 10 | 27 | " | 108 | 0 |

Note:
[1]Measured by 200 type GPC manufactured by WATERS Co., Ltd.
STYRAGEL-$10^6$, $10^6$, $10^5$, $10^4$ (4 feet × 4) were used as column.
Tetrahydrofuran was used as solvent.

TABLE 2

| Compounding recipe | |
|---|---|
| | Parts by weight |
| Polymer | 100 |
| HAF carbon | 50 |
| Aromatic oil | 10 |
| Stearic acid | 2 |
| Zinc oxide | 3 |
| Anti-oxidant 810NA[1] | 1 |
| Vulcanization accelerator CZ[2] | 0.6 |
| Vulcanization accelerator M[3] | 0.6 |
| Vulcanization accelerator C[4] | 0.4 |
| Sulfur | 1.5 |

Note:
[1]N-phenyl-N'-isopropyl-p-phenylenediamine
[2]N-cyclohexyl-2-benzothiazolylsulfeneamide
[3]2-mercaptobenzothiazole
[4]1,3-diphenylguanidine

TABLE 3

| | Polymer Sample No. | Polymer Parts by weight | Natural rubber NR (parts by weight) | cis-BR[1] | Hardness (JIS-A) | Elonga-[2] tion ($E_B$) (%) | Tensile strength[2] ($T_B$) (kgf/cm$^2$) | tanδ[3] 25° C. | tanδ[3] 75° C. | Roll[4] process-ability |
|---|---|---|---|---|---|---|---|---|---|---|
| Example | | | | | | | | | | |
| 1 | A | 70 | 30 | — | 69 | 460 | 256 | 0.22 | 0.15 | excellent |
| 2 | B | 70 | 30 | — | 70 | 470 | 252 | 0.25 | 0.16 | " |
| 3 | C | 70 | 30 | — | 68 | 450 | 245 | 0.22 | 0.14 | " |
| 4 | D | 70 | 30 | — | 69 | 490 | 250 | 0.23 | 0.15 | " |
| 5 | A | 70 | — | 30 | 69 | 390 | 225 | 0.21 | 0.16 | " |
| 6 | L | 70 | 30 | — | 68 | 470 | 257 | 0.22 | 0.16 | " |
| 7 | M | 70 | 30 | — | 66 | 490 | 223 | 0.27 | 0.22 | " |
| Comparative Example | | | | | | | | | | |
| 1 | E | 70 | 30 | — | 75 | 500 | 241 | 0.42 | 0.18 | " |
| 2 | F | 70 | 30 | — | 68 | 480 | 245 | 0.20 | 0.11 | good |
| 3 | G | 70 | 30 | — | 74 | 430 | 231 | 0.20 | 0.15 | excellent |
| 4 | H | 70 | 30 | — | 75 | 420 | 220 | 0.43 | 0.18 | " |
| 5 | I | 70 | 30 | — | 71 | 450 | 245 | 0.22 | 0.12 | poor |
| 6 | J/K | 35/35 | 30 | — | 70 | 500 | 232 | 0.21 | 0.13 | excellent |
| 7 | A | 10 | 90 | — | 67 | 520 | 281 | 0.14 | 0.11 | " |
| 8 | E | 70 | — | 30 | 75 | 380 | 215 | 0.39 | 0.17 | " |

Note:
[1]Polybutadiene (BR01 manufactured by Japan Synthetic Rubber Co., Ltd.) was used.
[2]Measured according to JIS K6301.
[3]Measured by using a viscoelastic spectrometer manufactured by Iwamoto Seisakusho Co., Ltd. under the measuring conditions that the frequency, the static elongation strain, and the dynamic strain were 10 Hz, 5%, and 0.2-0.5% respectively.
[4]Total evaluation was made taking into account time period until when roll retention took place, roll retention, edge-cut etc.

What is claimed is:

1. A rubber composition containing at least 30% by weight of a butadiene copolymer obtained by continuous polymerization and then coupling with silicon tetrachloride, which is characterized in that:
   (i) the content of the vinyl bonds in the polybutadiene portion is from 45 to 70%;
   (ii) the content of bound vinyl aromatic compound is from 30 to 50% by weight;
   (iii) the ratio Mw/Mn between the weight average molecular weight (Mw) and the number average molecular weight (Mn) when calculated as polystyrene according to the gel permeation chromatograph (GPC) method is from 2.5 to 5, and the distribution of the molecular weight is unimodal;
   (iv) the content of the copolymer having a weight average molecular weight of not more than 100,000 when calculated as polystyrene is from 10 to 30%;
   (v) the content of the copolymer having a weight average molecular weight of not less than 2,000,000 when calculated as polystyrene is from 10 to 30%;
   (vi) the Mooney viscosity ($ML_{1+4}$100° C.) is from 20 to 100; and
   (vii) the content of the polyvinyl aromatic block in the copolymer is not more than 5% by weight with respect to the total bound vinyl aromatic compound.

2. The rubber composition as claimed in claim 1, wherein said content of bound vinyl aromatic compound is from 33-50% by weight.

* * * * *